United States Patent
Knebel et al.

(10) Patent No.: US 10,215,974 B2
(45) Date of Patent: Feb. 26, 2019

(54) SELECTIVE/SINGLE PLANE ILLUMINATION MICROSCOPY (SPIM) ARRANGEMENT

(71) Applicant: Leica Microsystems CMS GmbH, Wetzlar (DE)

(72) Inventors: Werner Knebel, Kronau (DE); Vishnu Vardan Krishnamachari, Mannheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 332 days.

(21) Appl. No.: 14/778,908

(22) PCT Filed: Mar. 24, 2014

(86) PCT No.: PCT/EP2014/055877
§ 371 (c)(1),
(2) Date: Sep. 21, 2015

(87) PCT Pub. No.: WO2014/147261
PCT Pub. Date: Sep. 25, 2014

(65) Prior Publication Data
US 2016/0048014 A1 Feb. 18, 2016

(30) Foreign Application Priority Data
Mar. 22, 2013 (DE) .......... 10 2013 205 115

(51) Int. Cl.
*G02B 21/00* (2006.01)
*G02B 21/08* (2006.01)
(Continued)

(52) U.S. Cl.
CPC ......... *G02B 21/367* (2013.01); *G02B 21/002* (2013.01); *G02B 21/006* (2013.01);
(Continued)

(58) Field of Classification Search
CPC ............... G02B 21/367; G02B 21/002; G02B 21/0032; G02B 21/006; G02B 21/0076;
(Continued)

(56) References Cited

U.S. PATENT DOCUMENTS 6,975,457 B1 * 12/2005 Greenaway .............. G02B 5/18
359/15
2003/0186255 A1 * 10/2003 Williams ............... C07H 19/10
506/16
(Continued)

FOREIGN PATENT DOCUMENTS

DE 102007047464 A1 4/2009
DE 102008018476 A1 10/2009
(Continued)

OTHER PUBLICATIONS

International Search Report from PCT/EP2014/055877, filed Mar. 24, 2014, dated Jun. 27, 2014.

*Primary Examiner* — Marnie A Matt
(74) *Attorney, Agent, or Firm* — Patentbar International, P.C.

(57) ABSTRACT

A selective/single plane illumination microscopy (SPIM) arrangement having an illumination device (1) for generating a light sheet (3) illuminating a sample (2); and a detection device (5), comprising a detector (4), for detected light proceeding from the sample (2), is configured and refined in the interest of efficient and low-impact sample investigation with physically simple means in such a way that the detection device (5) comprises a device (6) for allocating different focal planes of the light sheet (3) to different regions (7) of the detector (4).

9 Claims, 6 Drawing Sheets

(51) Int. Cl.
*G02B 21/36* (2006.01)
*G02B 27/42* (2006.01)
*H04N 5/374* (2011.01)

(52) U.S. Cl.
CPC ....... *G02B 21/008* (2013.01); *G02B 21/0032* (2013.01); *G02B 21/0076* (2013.01); *G02B 21/086* (2013.01); *G02B 21/361* (2013.01); *G02B 27/4211* (2013.01); *H04N 5/374* (2013.01)

(58) Field of Classification Search
CPC .. G02B 21/008; G02B 21/086; G02B 21/361; G02B 27/4211; H04N 5/374
USPC .......................................................... 348/80
See application file for complete search history.

(56) References Cited

U.S. PATENT DOCUMENTS

2006/0158657 A1* 7/2006 De Lega ................ G01B 9/023
356/497
2010/0193673 A1* 8/2010 Power ................ G02B 21/0032
250/251
2010/0265575 A1* 10/2010 Lippert .................. G02B 21/16
359/385
2010/0309548 A1* 12/2010 Power .................. G02B 21/008
359/385
2011/0031414 A1* 2/2011 Lippert ................ G02B 21/002
250/459.1
2011/0261446 A1* 10/2011 Dunsby .............. G02B 21/0076
359/380
2013/0176622 A1* 7/2013 Abrahamsson ...... G02B 21/367
359/571
2015/0144490 A1* 5/2015 Deisseroth ............... G01N 1/30
204/461
2015/0362713 A1* 12/2015 Betzig ................ G02B 21/0064
250/459.1

FOREIGN PATENT DOCUMENTS

DE 202011110077 U1 1/2013
GB 2353392 A 2/2001

* cited by examiner

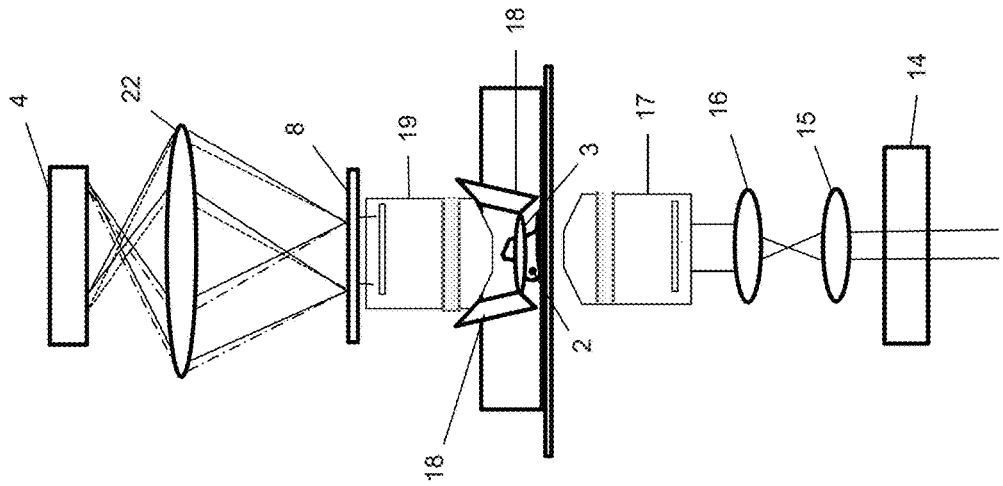
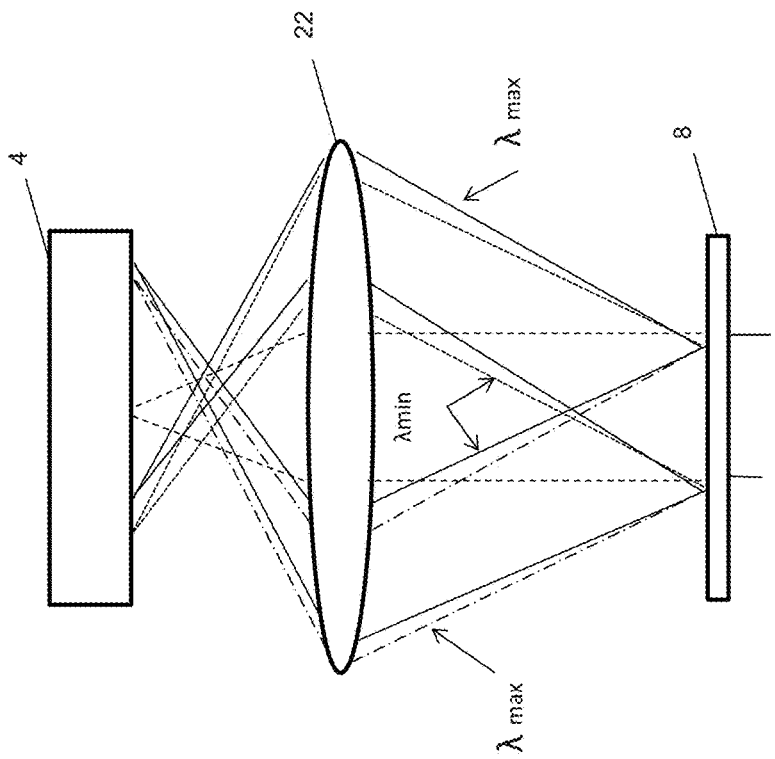
Fig. 4

SELECTIVE/SINGLE PLANE ILLUMINATION MICROSCOPY (SPIM) ARRANGEMENT

RELATED APPLICATIONS

This Application is a U.S. National Stage Under 35 USC § 371 of International Application PCT/EP2014/055877, filed on Mar. 24, 2014, which in turn claims priority to German Patent Application DE 10 2013 205 115.8, filed Mar. 22, 2013, both of which are incorporated herein by reference in their entirety.

FIELD OF THE INVENTION

The invention relates to a selective/single plane illumination microscopy (SPIM) arrangement having an illumination device for generating a light sheet illuminating a sample; and a detection device, comprising a detector, for detected light proceeding from the sample.

BACKGROUND OF THE INVENTION

An optical arrangement of the kind recited above is known, for example, from DE 10 2007 047 464 A1. The known optical arrangement comprises an illumination device for generating a light sheet illuminating a sample; and a detection device, comprising a detector, for detected light proceeding from the sample. In order to generate the light sheet necessary for SPIM, the known SPIM arrangement comprises suitable lenses in the illumination beam path. Also known, from DE 20 2011 110 077 U1, is a SPIM arrangement in which a light sheet is generated via a mirror arrangement at the detection objective.

One known area of utilization of SPIM technology is the field of fluorescence microscopy, fluorophores in the sample being excited with laser light. With SPIM technology, excitation takes place only in the plane of the light sheet. Damage to the sample from illumination light in other planes is thereby avoided.

In a SPIM arrangement, a light sheet is generated either by using an extended focus with the aid of a scanning device in order to illuminate a plane, or by using a cylindrical lens. Because it is usually desirable to illuminate a large area of objects, or large objects, the illumination aperture (NA) must be a low as possible. A consequence of this, however, is that the light sheet is very thick.

In the case of a long light sheet—approx. 300 µm for illumination with a 2.5× objective having an NA of 0.07—the light sheet thickness is usually greater than the depth of focus of the detection objective. Image data from the other two planes of the light sheet located above and below the actual depth of focus (unsharp regions above and below the actual depth of focus) cannot be used. This is very ineffective, and has the additional disadvantage that the sample regions located above and below the actual depth of focus are illuminated entirely needlessly, and as a result can possibly be damaged.

SUMMARY OF THE INVENTION

The object of the present invention is therefore to configure and refine a SPIM arrangement of the kind recited previously so as to enable efficient and low-impact sample investigation with physically simple means.

According to the present invention, the object presented is achieved by a SPIM arrangement having the features of claim 1. In accordance therewith, the SPIM arrangement is configured and refined in such a way that the detection device comprises a device for allocating different focal planes of the light sheet to different regions of the detector.

What has been recognized according to the present invention is firstly that even in the presence of a thick light sheet, whose thickness is greater than the depth of focus of a detection objective, it is possible by means of a skillful configuration of the detection device to utilize image data from the illuminated planes located above and below the actual depth of focus. What has further been recognized according to the present invention is that a device for allocating different focal planes of the light sheet to different regions of the detector achieves the stated object in a surprisingly simple manner. Concretely, the detection device comprises a device of this kind with which it is possible to sharply image several focal planes simultaneously, and to direct those images to different regions of the detector so as to enable further processing there. For example, rapid biological processes can be tracked over an enlarged volume (extended focus).

With the SPIM arrangement according to the present invention, the entire illuminated region (and thus a large volume and not only the depth-of-focus region of the detection objective) can now be sharply imaged. This results in appreciably higher contrast and hence a higher signal-to-noise ratio. The light stress on the sample is appreciably less as compared with a conventional SPIM method, since the sample can now be scanned with larger Z spacings than are presently possible.

The SPIM arrangement according to the present invention consequently yields a SPIM arrangement with which efficient sample investigation is enabled with physically simple means, due to the additional use of image data from planes located above and below the depth of focus region. Because regions of the sample from which image data are not being obtained are not illuminated, the SPIM arrangement according to the present invention also makes possible low-impact sample investigation.

Particularly advantageously, the device can comprise a multi-focus grating (MFG). The use of a multi-focus grating permits a reliable allocation of different focal planes to different regions of the detector. The use of such an MFG is known at present only in the sector of wide-field microscopy. The contrast attainable with wide-field microscopy is relatively low, and even lower with thicker samples. An MFG of this kind generates a focal series having a focus arranged with a mutual lateral offset.

When the SPIM arrangement is used in the sector of fluorescence microscopy, non-monochromatic fluorescent light is usually generated. Because an MFG, for example, operates optimally only for one wavelength, in additionally advantageous fashion the device can comprise a means for compensating for a wavelength dispersion.

In a physically simple and efficient manner, the means can comprise a chromatic correction grating (CCG) and/or a prism in order to compensate reliably for a wavelength dispersion. Using the combination of an MFG with a CCG and a prism, for example, a particularly reliable allocation of different focal planes of the light sheet to different regions of the detector, with simple and reliable compensation for a wavelength dispersion, is achievable with physically simple means.

Also in a physically simple manner, the detector can comprise a planar detection region that comprises the different regions necessary for the allocation of different focal planes. Also in a physically simple manner, the detector can comprise a CCD, cMOS, or sCMOS. Components of this kind ensure dependable and reliable operation of a SPIM arrangement.

Particularly advantageously, the device can be arranged in the pupil plane of a detection objective. This makes it possible to achieve a particularly simple configuration of the SPIM arrangement, by omitting further lenses and/or further optical components while retaining functionality. Particularly advantageously, detected light emerging from the device can be conveyed or imaged directly onto the detector by means of a further lens (without a CCG and/or prism). The construction is particularly simple as a result, and new capabilities are obtained in terms of spectral detection.

In the interest of particularly versatile utilization of the SPIM arrangement according to the present invention, the SPIM arrangement can be adapted in various ways to different investigation methods. The SPIM arrangement can be embodied to carry out simultaneous three-dimensional fluorescence correlation spectroscopy (3D FCS) measurements. Alternatively to this, the SPIM arrangement can be embodied to carry out three-dimensional fluorescence lifetime microscopy (3D FLIM) measurements. Embodiment of the SPIM arrangement to carry out measurements based on multi-photon excitations has also proven very advantageous. Multi-photon excitation of this kind is not possible for thick samples in the wide-field microscopy sector. The SPIM arrangement according to the present invention can, however, advantageously also be embodied for other applications.

The SPIM arrangement according to the present invention yields further advantages, as compared with confocal microscopy, in the scanning of extended samples that are larger than 100 μm. Aberrations occur when a thick sample is illuminated in spot fashion with a high numerical aperture (NA), since the peripheral beams travel on a different path and do not arrive at the same location within the illumination focus. This results in blurring of the illumination focus, and thus in low resolution. In a SPIM arrangement, however, illumination occurs with an appreciably lower NA (typically 0.07 to 0.2 NA), so that the difference in optical path length for the peripheral beams is appreciably less than at higher NA.

There are various ways of advantageously embodying and further developing the teaching of the present invention. The reader is referred, for that purpose, on the one hand to the subordinate claims and on the other hand to the explanation below of a preferred exemplifying embodiment of the invention with reference to the drawings.

BRIEF DESCRIPTION OF THE DRAWINGS

In conjunction with the explanation of the preferred exemplifying embodiments of the invention with reference to the drawings, an explanation will also be given of generally preferred embodiments and further developments of the teaching. In the drawings:

FIG. 4 is a schematic side view of a further exemplifying embodiment of the SPIM arrangement according to the present invention, a CCG and a prism additionally being omitted as compared with the exemplifying embodiment shown in FIG. 3, for which purpose the region of FIG. 4 on the right shows substantially the overall configuration of the SPIM arrangement and the region of FIG. 4 on the left shows the configuration after the detection objective as an enlarged depiction;

DETAILED DESCRIPTION OF THE PREFERRED EMBODIMENTS

Figure 1:
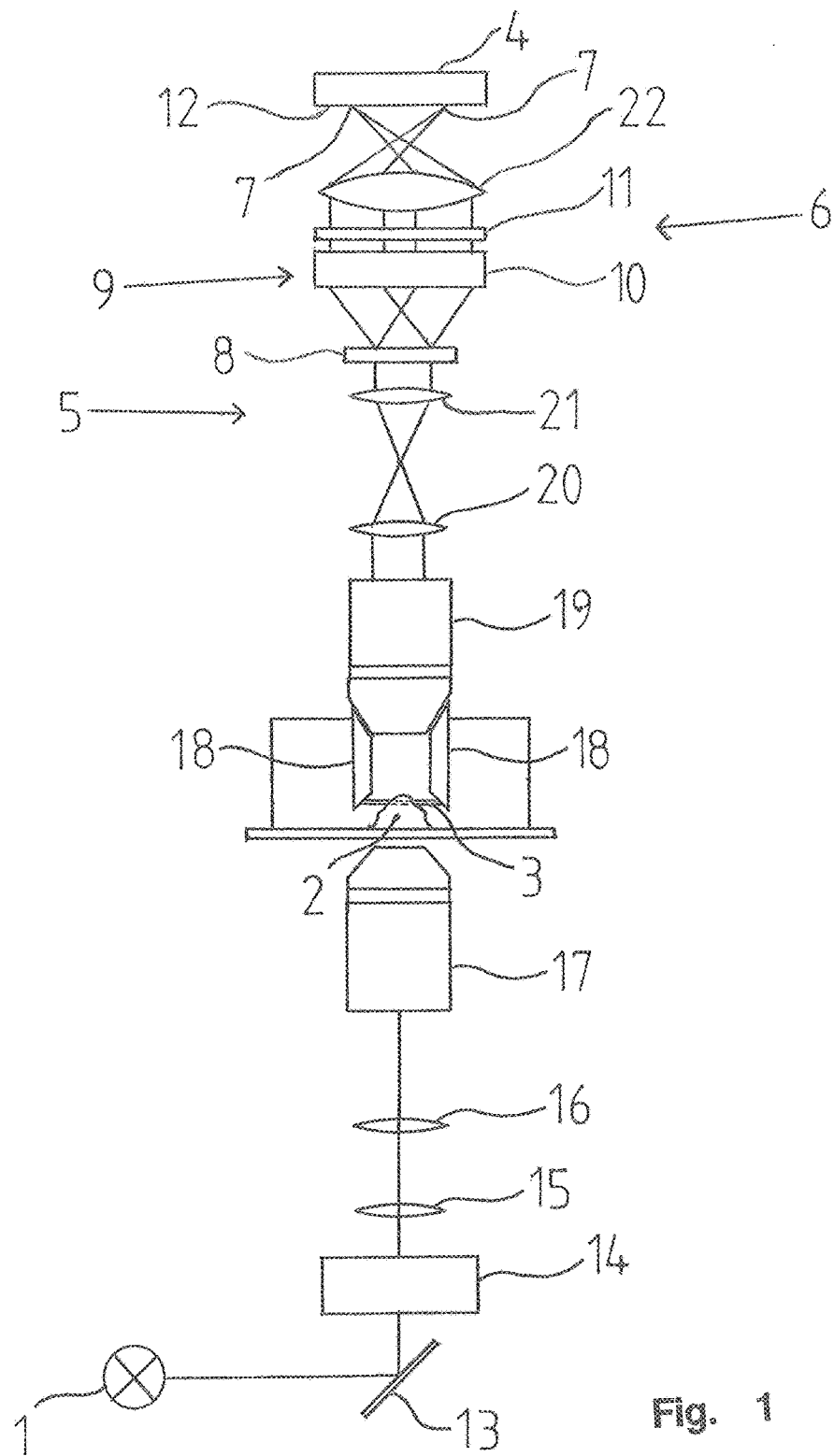
FIG. 1 is a schematic side view of an exemplifying embodiment of the SPIM arrangement according to the present invention.

FIG. 1 is a schematic side view of an exemplifying embodiment of a SPIM arrangement according to the present invention, having an illumination device 1 for generating a light sheet 3 illuminating a sample 2; and a detection device 5, comprising a detector 4, for detected light proceeding from sample 2. In the interest of efficient and low-impact sample investigation with physically simple means, detection device 5 comprises a device 6 for allocating different focal planes of light sheet 3 to different regions 7 of detector 4. Concretely, device 6 comprises an MFG 8 that is arranged in a Fourier plane.

Figure 3:
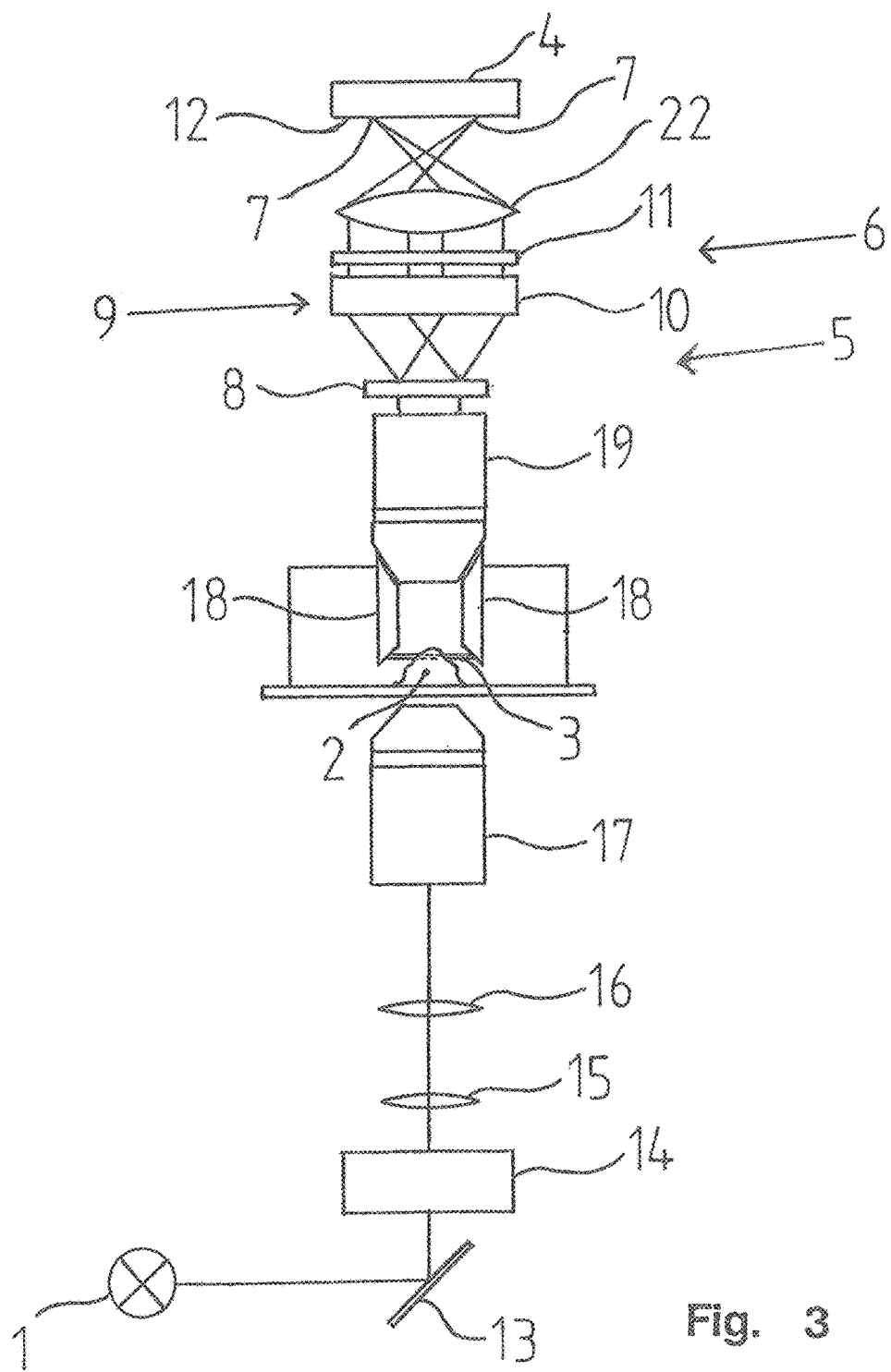
FIG. 3 is a schematic side view of an exemplifying embodiment of the SPIM arrangement according to the present invention, an MFG being arranged directly in the pupil plane of a detection objective.

Because illumination occurs in the SPIM arrangement via an additional illumination objective 17, the pupil plane of a detection objective 19 can be used directly, as shown in FIG. 3, as a location for introducing MFG 8. This decreases the complexity of the optical configuration, and correspondingly also reduces the costs of the configuration. Greater stability can also be expected as a result of the very short beam path.

MFG 8 can be arranged as a plug-in module in the immediate vicinity of detection objective 19. The entrance pupil is typically located in the vicinity of a screw-in thread of detection objective 19. It is also conceivable to incorporate MFG 8 into detection objective 19, or to attach it into a lens that is located in the vicinity of the entrance pupil.

In order to compensate for a wavelength dispersion in the context of non-monochromatic detected light, device 6 comprises a suitable means 9 having a CCG 10 and a prism 11. Detected light from different focal planes passes through device 6 and strikes a planar detection region 12 of detector 4.

The exemplifying embodiment of FIG. 1 comprises on the illumination side, after illumination device 1 (which is usually embodied as a laser), a beam splitter 13 that reflects illumination light onto a scanning device 14 in the form of an X-Y scanner. Illumination light then passes through a scanning lens 15 and a tube lens 16, and travels into illumination objective 17. In order to generate light sheet 3, two mirror elements 18 are arranged on detection objective 19 and generate light sheet 3 together with scanning device 14. Mirror elements 18 are arranged in such a way that an illumination beam generated by illumination device 1 can be guided via scanning device 14 and through illumination objective 17 onto mirror elements 18 in order to generate, by reflection at mirror elements 18, a substantially horizontal illumination beam (light sheet 3) for lateral illumination of sample 2.

The illumination beam can be guided with the aid of scanning device 14 at the edge of the scanning field constituted by scanning device 14, the illumination beam being guided via illumination objective 17 onto mirror elements 18. Light sheet 3 is built up sequentially by moving the illumination beam along a line by means of scanning device 14. When the illumination beam is moved by means of scanning device 14 to the other side of the scanning field, the illumination beam can then strike the other mirror element 18, which then builds up a light sheet from that side. This consequently makes possible light-sheet illumination of sample 2 from several sides, as a function of the individual arrangement of mirror elements 18.

Detected light proceeding from sample 2 travels through detection objective 19 to a tube lens 20 and to a further lens 21 in order to generate the Fourier plane in which MFG 8 is positioned. After passing through CCG 10 and prism 11, the detected light passes through a further lens 22 in order to focus detected light onto regions 7 on the planar detection region 12.

Light sheet 3 can be generated via illumination objectives that are arranged at a 90-degree angle to an optical axis. Alternatively thereto, light sheet 3 can be generated by way of mirror elements 18 that are controlled by illumination objective 17, the illumination light beam being arranged parallel to the detection beam path. Light sheet 3 can furthermore be generated via scanning device 14 or by way of a cylindrical lens arrangement. If light sheet 3 is generated via scanning device 14, the color dispersion can advantageously be utilized. If light sheet 3 is generated by way of a cylindrical lens arrangement, the color dispersion must be compensated for by a color correction apparatus, for example CCG 10.

Figure 2:
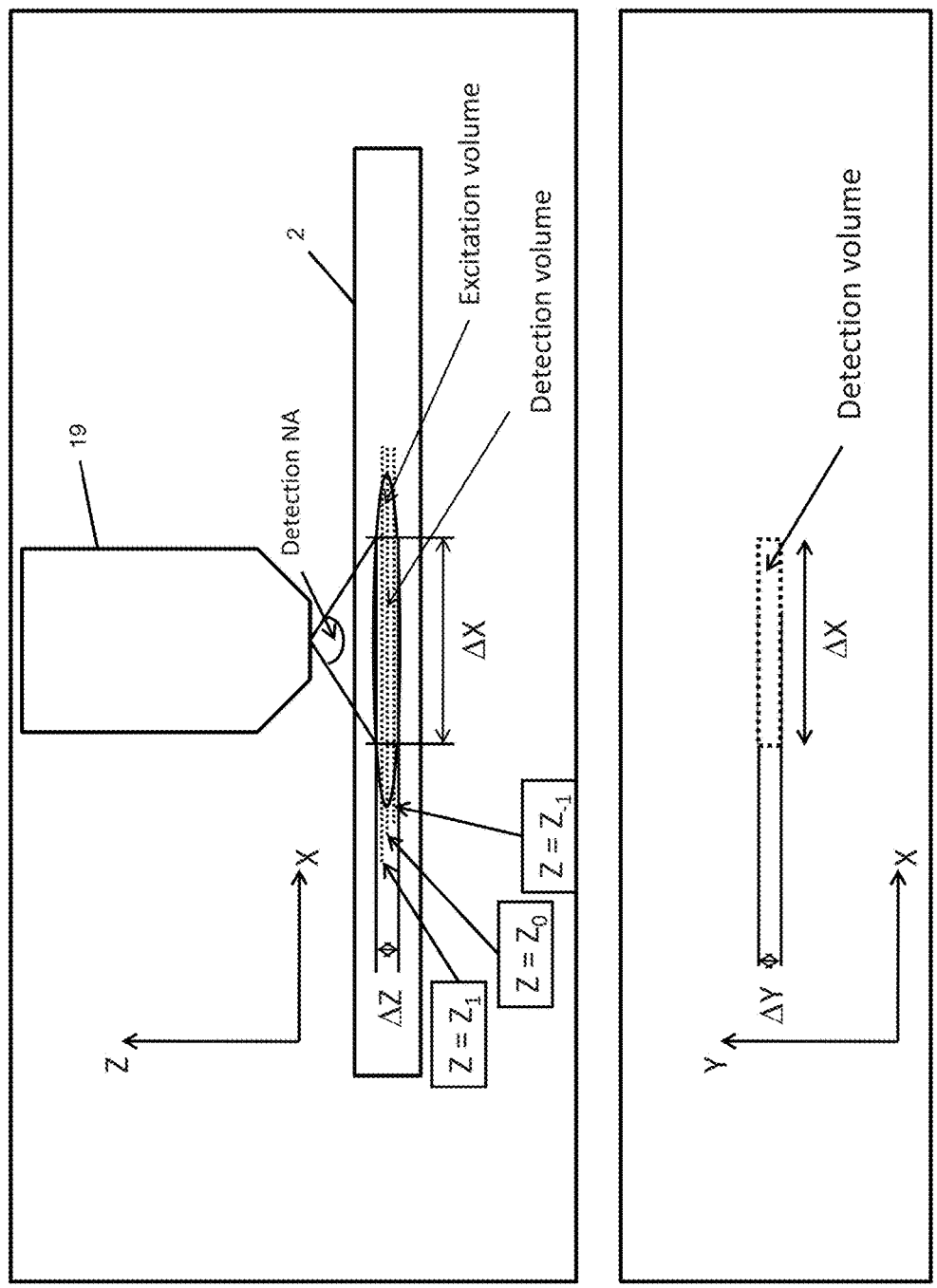
FIG. 2 is a schematic side view and a schematic plan view of the detection region of the exemplifying embodiment of FIG. 1, minor elements 18 having been omitted for the sake of simplicity.

In the context of illumination via scanning device 14, the following situation results:

The illumination focus extends over a certain length and width, and forms the excitation volume. A quantity $\Delta X$ thereof in the X direction and a quantity $\Delta Y$ thereof in the Y direction is imaged in detection objective 19. Depending on the dimension of the illumination focus in the Z direction, the volume can encompass several imaging depths of detection objective 19. Three planes (Z1, Z0, and Z-1) will be assumed below. This situation is depicted in FIG. 2, the upper part of FIG. 2 being a side view and the lower part of FIG. 2 a plan view looking through detection objective 19 onto sample 1.

When light sheet 3 is generated via scanning device 14, only a narrow region inside sample 2 is illuminated at time t0. When a camera, or detector 4, acquires an image at time t0, then only a narrow region (a few rows) on the camera chip or on detector 4 is exposed. If the different focal planes are then offset laterally on the camera chip, then depending on the number n of divisions, a corresponding number n of narrow regions is imaged simultaneously at time t0. In the exemplifying embodiment, three planes are depicted. If the camera, or detector 4, is read out synchronously with the motion of scanning device 14, for example one camera image for each illuminated region, an overall image can then be created therefrom.

If the dispersion compensation resulting from CCG 10 and prism 11 is taken away (as shown in FIG. 4), a spectrum is generated on the camera chip or on detector 4 for each row. This spectrum can be analyzed using software. Changes over time in the spectrum on the scale of microseconds to milliseconds can be detected, in accordance with the image acquisition time of the camera or of detector 4 and the sweep time of scanning device 14; this can be very informative for biological processes.

The configuration is appreciably simpler when MFG 8 is arranged directly in the pupil plane of detection objective 19. Omission of the unit made up of CCG 10 and prism 11 allows the dispersion of MFG 8 to be utilized, by detecting the color division as n lateral offsets on detector 4.

Because a spectrum is produced on the planar detector or on detector 4 as a result of the omission of CCG 10 and prism 11, it is easily possible to analyze that spectrum in spatially resolved fashion.

The mounting of MFG 8 in the pupil plane of detection objective 19 constitutes a very substantial advantage of the configuration according to the present invention, in which context additional lenses such as those necessary in the existing art can be omitted. In addition, further omission of CCG 10 and of prism 11 makes the configuration even simpler, and new capabilities are created, for example in terms of spectral detection.

Figure 5:
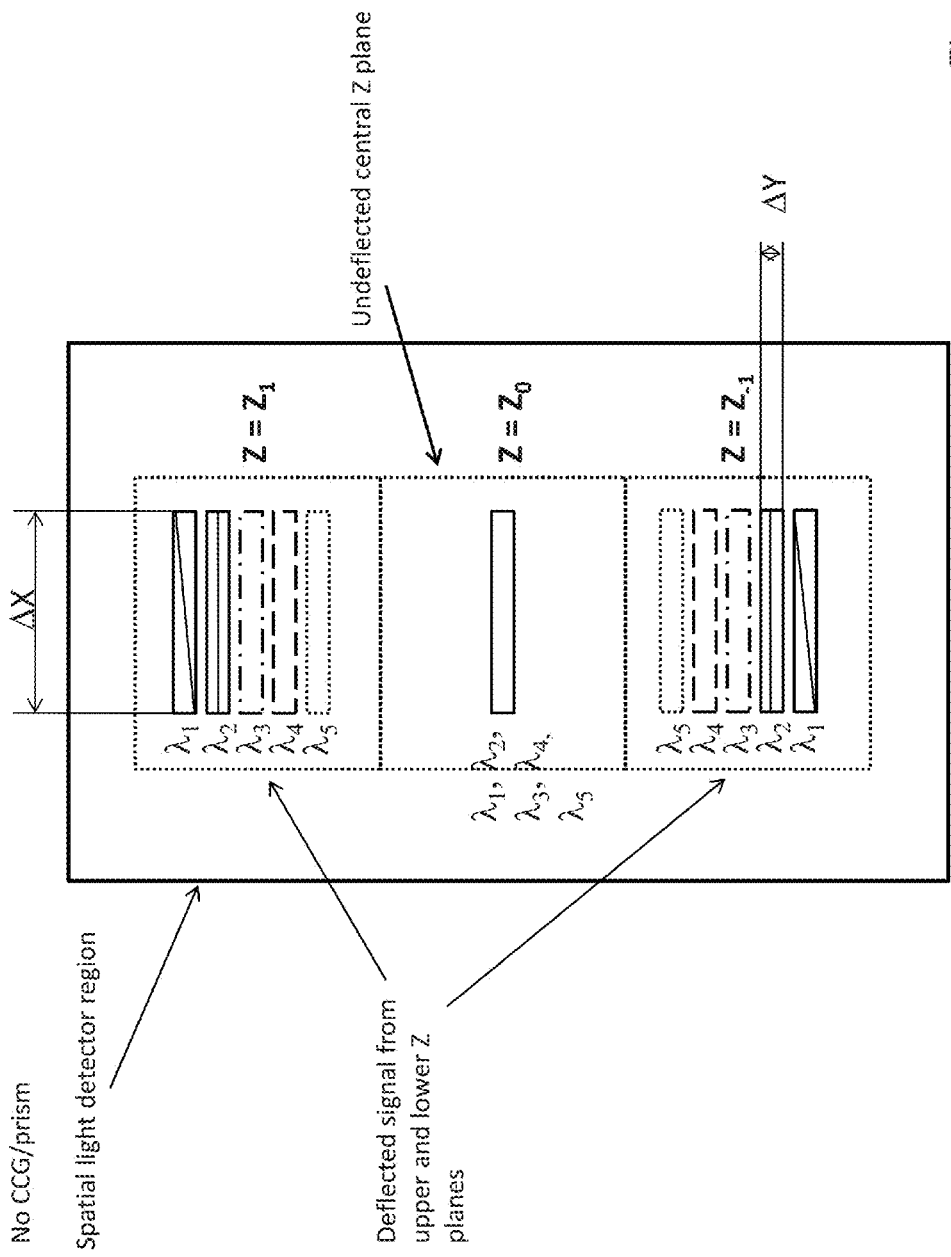
FIG. 5 is a schematic depiction of a spectral division in the context of the exemplifying embodiment without a CCG and without a prism, in three Z planes.

FIG. 5 is a schematic depiction of the spectral division of the detected light into the upper and lower Z planes in the region of detector 4, in the context of the exemplifying embodiment having no CCG 10 or prism 11. Wavelengths increase from $\lambda_1$ to $\lambda_5$. No such division takes place in the center plane $Z_0$.

MFG 8 can be configured in various ways. There are types based on reflection (reflection grating), transmission (transmission grating), or a prism-type embodiment (grating prisms).

Figure 6:
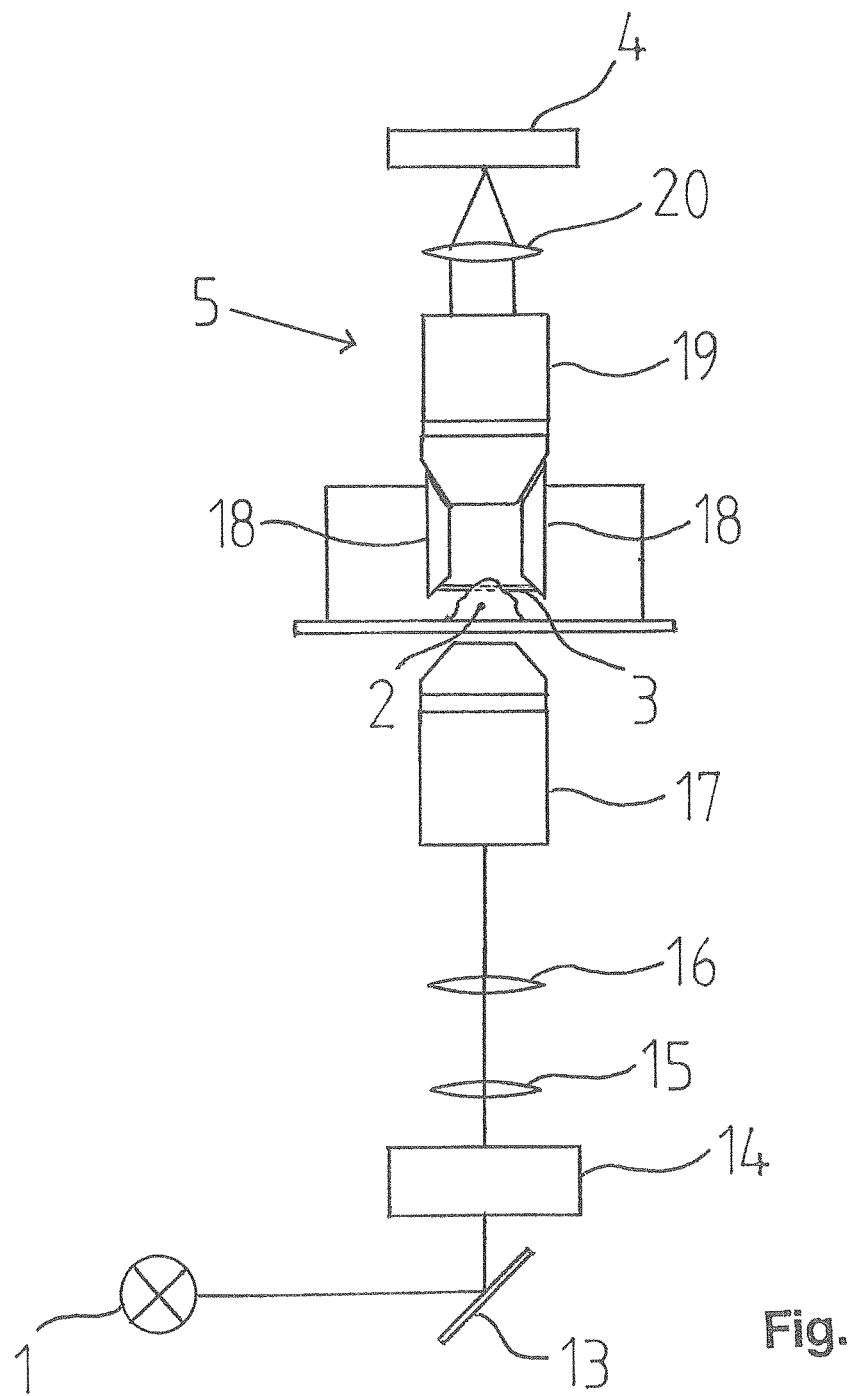
FIG. 6 is a schematic side view of a conventional SPIM arrangement.

FIG. 6 is a schematic side view showing a conventional SPIM arrangement in which a detected light proceeding from sample 2 is guided through detection objective 19 and tube lens 20 directly onto detector 4. The conventional configuration of the SPIM arrangement according to FIG. 6 otherwise corresponds to the exemplifying embodiment according to FIG. 1, identical elements being labeled with identical reference characters.

To avoid repetition, the reader is referred to the general portion of the description, and to the appended claims, with regard to further advantageous embodiments of the SPIM arrangement according to the present invention.

Lastly, be it noted expressly that the exemplifying embodiment described above serves only for discussion of the teaching that is claimed, but does not limit it to the exemplifying embodiment.

PARTS LIST

1 Illumination device
2 Sample
3 Light sheet
4 Detector
5 Detection device
6 Device
7 Region
8 MFG
9 Means for compensating for a wavelength dispersion
10 CCG
11 Prism
12 Detection region
13 Beam splitter
14 Scanning device
15 Scanning lens
16 Tube lens
17 Illumination objective
18 Mirror element
19 Detection objective
20 Tube lens
21 Lens
22 Lens

What is claimed is:

1. A selective/single plane illumination microscopy (SPIM) arrangement, comprising:
   an illumination device for generating a light sheet illuminating a sample, wherein the light sheet is generated with the aid of a scanning device; and
   a detection device, comprising a detector for detecting light proceeding from the sample,
   wherein the detection device further comprises an allocation device, without a chromatic correction grating (CCG) or a prism for dispersion compensation, for allocating different focal planes of the light sheet to different regions of the detector, and wherein said allocation device is arranged in a pupil plane of a detection objective as a plug-in module in a vicinity of the detection objective, or said allocation device is attached into a lens located in a vicinity of an entrance pupil of the detection objective, and
   wherein a spectrum of the detected light from the sample is generated on the detector and wherein said spectrum is analyzed with predetermined software.

2. The SPIM arrangement according to claim 1, wherein the allocation device comprises a multi-focus grating (MFG).

3. The SPIM arrangement according to claim 1, wherein the detector comprises a planar detection region.

4. The SPIM arrangement according to claim 1, wherein the detector comprises a CCD, cMOS, or sCMOS.

5. The SPIM arrangement according to claim 1, wherein the detected light emerging from the allocation device is conveyed directly onto the detector via a further lens without passing through a chromatic correction grating (CCG).

6. The SPIM arrangement according to claim 1, wherein the SPIM arrangement is embodied to carry out simultaneous three-dimensional fluorescence correlation spectroscopy (3D FCS) measurements.

7. The SPIM arrangement according to claim 1, wherein the SPIM arrangement is embodied to carry out measurements based on multi-photon excitations.

8. The SPIM arrangement according to claim 1, wherein the detected light emerging from the allocation device is conveyed directly onto the detector via a further lens without passing through a prism.

9. The SPIM arrangement according to claim 1, wherein the SPIM arrangement is embodied to carry out three-dimensional fluorescence lifetime microscopy (3D FLIM) measurements.

* * * * *